(12) United States Patent
Muller et al.

(10) Patent No.: US 10,554,609 B2
(45) Date of Patent: *Feb. 4, 2020

(54) HOST STATE-SENSING FOR MESSAGE INTERRUPTION

(71) Applicant: International Business Machines Corporation, Armonk, NY (US)

(72) Inventors: Michael Muller, Medford, MA (US); Daniel M. Gruen, Newton, MA (US); Daniel Q. Chen, Chelmsford, MA (US); Chuang Li, Beijing (CN); Mary E. Raven, Merrimack, NH (US); Xu Guang Gu, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/236,477

(22) Filed: Aug. 14, 2016

(65) Prior Publication Data

US 2016/0380949 A1    Dec. 29, 2016

Related U.S. Application Data

(63) Continuation of application No. 11/318,803, filed on Dec. 27, 2005, now Pat. No. 9,426,103.

(51) Int. Cl.
| | |
|---|---|
| *H04L 12/58* | (2006.01) |
| *H04L 12/18* | (2006.01) |
| *H04L 29/12* | (2006.01) |
| *H04L 29/08* | (2006.01) |

(52) U.S. Cl.
CPC .......... *H04L 51/26* (2013.01); *H04L 12/1813* (2013.01); *H04L 51/04* (2013.01); *H04L 61/1594* (2013.01); *H04L 67/327* (2013.01)

(58) Field of Classification Search
CPC ...... H04L 12/1813; H04L 51/04; H04L 51/23
USPC ........................................................ 709/207
See application file for complete search history.

(56) References Cited

U.S. PATENT DOCUMENTS

| | | | |
|---|---|---|---|
| 6,446,112 B1 | 9/2002 | Bunney et al. | |
| 6,449,646 B1 | 9/2002 | Sikora et al. | |
| 6,553,416 B1 | 4/2003 | Chari et al. | |
| 6,565,608 B1 | 5/2003 | Fein et al. | |
| 6,732,364 B1 | 5/2004 | Bhaskaran et al. | |
| 6,988,128 B1 | 1/2006 | Alexander et al. | |

(Continued)

*Primary Examiner* — Joseph L Greene
(74) *Attorney, Agent, or Firm* — Steven M. Greenberg, Esq.; Shutts & Bowen LLP

(57) ABSTRACT

Embodiments of the present invention address deficiencies of the art in respect to managing interrupting requests to engage in a collaborative session and provide a novel and non-obvious method, system and computer program product for host state sensing for message interruptions. In one embodiment of the invention, a data processing system configured for host sensing for message interruption can include a messenger disposed is a host computing platform, prioritization logic including program code enabled to assign priorities to incoming messages, and host state sensing logic coupled to the host computing platform. The host state sensing logic can include program code enabled to adjust a threshold value for permitting message interruptions for messages having assigned priorities beyond the threshold value.

19 Claims, 2 Drawing Sheets

(56) References Cited

U.S. PATENT DOCUMENTS

| | | |
|---|---|---|
| 7,096,255 B2 | 8/2006 | Malik |
| 7,139,806 B2 | 11/2006 | Hayes et al. |
| 7,209,916 B1 | 4/2007 | Seshadri et al. |
| 7,325,034 B2 | 1/2008 | Douglis et al. |
| 7,543,053 B2 | 6/2009 | Goodman et al. |
| 2002/0054117 A1 | 5/2002 | van Dantzich et al. |
| 2002/0130904 A1 | 9/2002 | Becker et al. |
| 2003/0018718 A1 | 1/2003 | Maehiro |
| 2003/0055908 A1 | 3/2003 | Brown et al. |
| 2003/0065721 A1 | 4/2003 | Roskind |
| 2003/0076353 A1 | 4/2003 | Blackstock et al. |
| 2003/0083047 A1 | 5/2003 | Phillips et al. |
| 2003/0149754 A1 | 8/2003 | Miller et al. |
| 2003/0195937 A1* | 10/2003 | Kircher, Jr. .......... G06Q 10/107 709/207 |
| 2003/0212646 A1 | 11/2003 | Horvitz |
| 2003/0222765 A1 | 12/2003 | Curbow et al. |
| 2004/0068545 A1 | 4/2004 | Daniell et al. |
| 2004/0117534 A1* | 6/2004 | Parry .................. G06F 13/24 710/260 |
| 2004/0261030 A1 | 12/2004 | Nazzal |
| 2005/0055405 A1 | 3/2005 | Kaminsky et al. |
| 2005/0071433 A1 | 3/2005 | Shah |
| 2005/0086309 A1 | 4/2005 | Galli et al. |
| 2005/0132011 A1 | 6/2005 | Muller et al. |
| 2005/0204001 A1* | 9/2005 | Stein .................... G06Q 10/107 709/206 |
| 2006/0010394 A1 | 1/2006 | Chaudhri et al. |
| 2006/0080263 A1 | 4/2006 | Willis et al. |
| 2006/0178893 A1 | 8/2006 | Mccallie et al. |
| 2006/0200842 A1 | 9/2006 | Chapman et al. |
| 2006/0236390 A1* | 10/2006 | Matovsky ............... G06F 21/55 726/22 |
| 2006/0242246 A1 | 10/2006 | Lyle et al. |
| 2007/0014284 A1 | 1/2007 | Daniels et al. |
| 2007/0022157 A1 | 1/2007 | Daniels et al. |
| 2007/0174768 A1 | 7/2007 | Sen et al. |
| 2008/0120545 A1 | 5/2008 | Geyer et al. |

* cited by examiner

HOST STATE-SENSING FOR MESSAGE INTERRUPTION

CROSS-REFERENCE TO RELATED APPLICATIONS

This application is a Continuation of U.S. patent application Ser. No. 11/318,803, filed on Dec. 27, 2005, the entirety of which is herein incorporated by reference.

BACKGROUND OF THE INVENTION

Field of the Invention

The present invention relates to the field of collaborative computing and more particularly to instant messaging and chat systems.

Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments such as instant messaging and persistent chat rooms.

In an instant messaging or persistent chat room environment, a messaging session can be requested by a collaborator, and upon acceptance of the request, a human-to-human collaborative session can be established in which real-time or near real-time messages can be exchanged as between the collaborators party to the session. The exchange of messages can continue until the session is terminated. Additional requests for collaborative sessions can result in the establishment of different environments which can execute concurrently albeit separately from one another. As it will be recognized, managing multiple collaborative sessions at once can become more difficult as the number of sessions increases.

Hence, as human-to-human collaborative environments, instant messaging and chat room technologies provide an efficient and useful method for personal and business communications. Inefficiencies can be introduced, however, when a user receives several requests to establish collaborative sessions for different collaborative environments. In this regard, determining whether or not to permit an interruption to engage in a collaborative session often relates to the level of urgency for a particular collaborative session. Accordingly, prioritization schemes have been developed which prioritize incoming messages across multiple collaborative environments.

BRIEF SUMMARY OF THE INVENTION

Embodiments of the present invention address deficiencies of the art in respect to managing interrupting requests to engage in a collaborative session and provide a novel and non-obvious method, system and computer program product for host state sensing for message interruptions. In one embodiment of the invention, a data processing system configured for host sensing for message interruption can include a messenger disposed in a host computing platform, prioritization logic including program code enabled to assign priorities to incoming messages, and host state sensing logic coupled to the host computing platform. The host state sensing logic can include program code enabled to adjust a threshold value for permitting message interruptions for messages having assigned priorities beyond the threshold value.

In another embodiment of the invention, a host state sensing method for message interruption can include permitting a message interruption only for messages in a messaging system having corresponding assigned priorities which exceed a pre-configured threshold value, and periodically adjusting the pre-configured threshold value responsive to sensing a condition in a host computing platform for the messaging system. In one aspect of the invention, permitting a message interruption only for messages in a messaging system having corresponding assigned priorities which exceed a pre-configured threshold value can include receiving a message in the messaging system, assigning a priority to the received message, comparing the assigned priority to the pre-configured threshold value, and permitting an interruption for the message if the assigned priority crosses the pre-configured threshold.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for host state sensing for message interruption. In accordance with an embodiment of the present invention, individual messages can be assigned a priority as messages are received in a host computing platform. The assigned priority can be based upon the identity of the sender of the received message, the content or nature of the message, or contemporaneous environmental conditions in the host computing platform. The assigned priority can be compared to a pre-configured threshold value. The recipient in the host computing platform can receive a notification of a received message only when the received message has an assigned priority which crosses the threshold value.

Notwithstanding, the pre-configured threshold value can change as the environmental conditions in the host computing platform change. Specifically, the environmental conditions in the host computing platform can be monitored. When a condition change is detected in the host computing platform, it can be determined whether or not to adjust the pre-configured threshold value. Examples include sensing the launching of one of a specified list of applications, idle time and periods of activity in the input methods of the host computing application and the use of particular peripheral devices in the host computing platform. In this way, interruptability of an end user can vary depending upon the state of a corresponding host computing platform.

Figure 1:
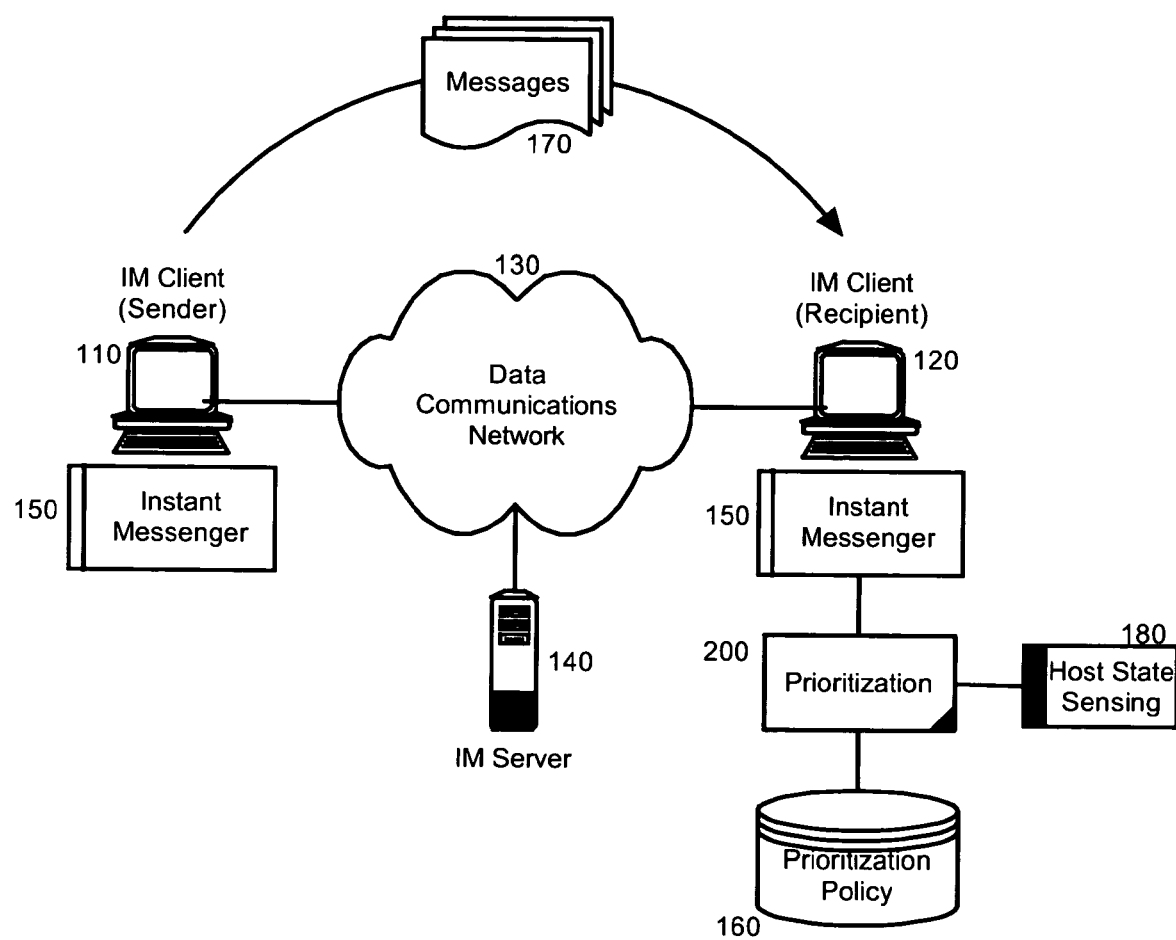
FIG. 1 is a schematic illustration of an instant messaging system configured for host state sensing for message interruption; and, FIG. 2 is a flow chart illustrating a process for host state sensing for message interruption.

In further illustration, FIG. 1 is a schematic illustration of an instant messaging data processing system configured for host state sensing for message interruption where the messages are instant messages. In the instant messaging data processing system, an instant messaging client 110 can be configured with instant messaging logic 150. The instant messaging client 110 can be communicatively linked to another instant messaging client 120 also configured with instant messaging logic 150. In this way, the instant messaging client 110 (acting as a sender) can transmit messages over the data communications network 130 to the instant messaging client 120 (acting as a recipient). Optionally, an instant messaging server 140 can facilitate the exchange of messages between the instant messaging clients 110, 120, although the instant messaging clients 110, 120 need not reside in the same instant messaging network and the instant messaging clients 110, 120 can reside in different instant messaging networks.

Notably, prioritization logic 200 can be coupled to a prioritization policy 160 for the instant messaging logic 150. The prioritization policy 160 can specify both priorities to be applied to incoming messages 170 and a pre-configured threshold for permitting a message interruption. In regard to the former, incoming messages 170 can be prioritized according to the time when the messages 170 are received, according to the presence of the sources of messages 170 in a buddy list, according to a relationship hierarchy for the sources of messages 170, and according to a category or role assigned to the sources of messages 170 and prioritized with respect to other sources of other messages 170.

In regard to the latter, a threshold value can be set above which a notification can be provided for an incoming message, and below which a message interruption is not permitted. (Of course, the inverse condition also can be true where a notification can be provided where the prioritization falls below the threshold and does not exceed the threshold). Notwithstanding, host state sensing logic 180 can monitor the state of the instant messaging client 120 and the host state sensing logic 180 can upwardly or downwardly adjust the threshold value. Specifically, when the host state sensing logic 180 detects the activation of a particular application, the use of a particular input method, or the use of a particular peripheral device, it can be presumed that an interruption is desirable or undesirable. Examples include the activation of a presentation mode in a slide ware application, the activation of screen-sharing in an e-meeting, presentation ware, and the activation of demonstration ware. Other host states can include environmental states such as the time or day. Finally, applications can be configured with an option to manually increase the threshold that can be detected by the host state sensing logic 180.

Figure 2:
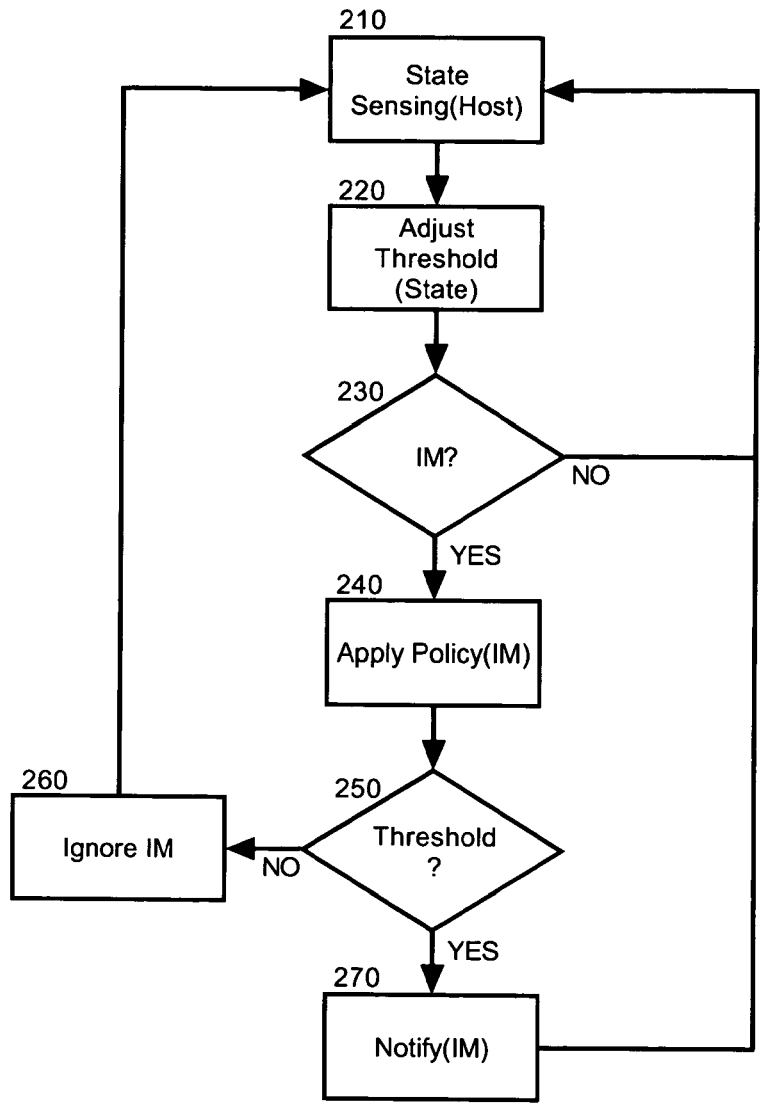

Utilizing the host state sensing logic 180, the pre-configured threshold can change dynamically to affect when incoming messages 170 are permitted to cause an interruption in the instant messaging client 120. In more particular illustration, FIG. 2 is a flow chart illustrating a process for host state sensing for message interruption. Beginning in block 210, the state of the host computing platform can be sensed and in block 220, the pre-configured threshold for message interruption can be adjusted to account for the sensed state. For instance, where the sensed state indicates that a message interruption is desirable, such as when activated applications in the host computing platform indicate a desirability for collaboration, the threshold can be lowered. In contrast, when the sensed state indicates that a message interruption is undesirable, the threshold can be raised.

In decision block 230, it can be determined whether a message has been received in the host computing platform. The message can include, for example, an instant message or a chat session message, to name two. If so, in block 240, the prioritization policy can be applied to the received message to assign a priority to the received message. In decision block 250, if the assigned priority of the received message does not exceed the threshold, in block 260 the received message can be ignored. Otherwise, if the assigned priority of the received message exceeds the threshold in decision block 250, in block 270 a message interruption can be permitted and a notification can be generated in the host computing platform.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system configured for host sensing for message interruption, the system comprising: a processor coupled to memory elements through a system bus; a messenger disposed in a host computing platform and receiving messages corresponding to a particular end user; prioritization logic comprising program code and executing by the processor so as to be enabled to, for each one of the received messages, determining a corresponding source of the one of the received messages, determine a position in a relationship hierarchy, that grades or ranks sources of messages, for the corresponding source relative to the particular end user, and assign a priority value to the one of the received messages based upon the position in the relationship hierarchy; the messenger, for each one of the received messages, in response to the receipt of the one of the received messages, comparing the priority value assigned to the one of the received messages to a pre-configured threshold value and permitting a message interruption for the one of the received messages prompting the particular end user to establish a collaborative session with a corresponding source of the one of the received messages only on condition that the priority value exceeds the pre-configured threshold value; and, host state sensing logic comprising program code enabled to respond to an activation of a particular application pre-specified by the end user by dynamically adjusting the threshold value such that for subsequently received messages, a different priority value when compared to the dynamically adjusted threshold value permits the message interruption.

2. The system of claim 1, wherein the messenger is an instant messenger.

3. The system of claim 1, wherein the messenger is a chat client.

4. The system of claim 1, wherein the program code of the host state sensing logic enabled to adjust the threshold value for permitting message interruptions for messages having assigned priorities beyond the threshold value comprises program code to adjust the threshold value.

5. The system of claim 1, wherein the program code of the host state sensing logic enabled to adjust the pre-configured threshold value for permitting message interruptions for messages having assigned priorities beyond the pre-configured threshold value further comprises program code to adjust the pre-configured threshold value which fall below the pre-configured threshold value.

6. A host state sensing method for message interruption, the method comprising: receiving messages in a messaging system executing in memory of a computer corresponding to a particular end user; for each one of the received messages, determining a corresponding source of the one of the received messages, determining a position in a relationship hierarchy, that grades or ranks sources of messages, for the corresponding source relative to the particular end user, and assigning a priority value to the one of the received messages based upon the position in the relationship hierarchy; for each one of the received messages, in response to the receipt of the one of the received messages, comparing the priority value assigned to the one of the received messages to a pre-configured threshold value and permitting a message interruption for the one of the received messages prompting the particular end user to establish a collaborative session with a corresponding source of the one of the received messages only on condition that the priority value exceeds the a-pre-configured threshold value; and, responding to an activation of a particular application pre-specified by the end user by dynamically adjusting the threshold value such that for subsequently received messages, a different priority value when compared to the dynamically adjusted threshold value permits the message interruption.

7. The method of claim 6, wherein permitting a message interruption only for ones of the received messages having a corresponding assigned priority which exceeds the pre-configured threshold value, comprises:
comparing the corresponding assigned priority to the pre-configured threshold value; and,
permitting an interruption for the message when the corresponding assigned priority crosses the pre-configured threshold value.

8. The method of claim 7, wherein permitting a message interruption only for ones of the received messages having a corresponding assigned priority which exceeds the pre-configured threshold value comprises permitting the interruption for the ones of the received messages when the assigned priority exceeds the pre-configured threshold value.

9. The method of claim 7, wherein permitting a message interruption only for ones of the received messages having a corresponding assigned priority which exceeds the pre-configured threshold value comprises permitting the interruption for the ones of the received messages when the assigned priority falls below the pre-configured threshold value.

10. A computer program product comprising a non-transitory computer usable storage medium having computer usable program code for host state sensing for message interruption, the computer program product including: computer usable program code for receiving messages in a messaging system executing in memory of a computer corresponding to a particular end user; computer usable program code for determining for each one of the received messages, a corresponding source of the one of the received messages, determining a position in a relationship hierarchy, that grades or ranks sources of messages, for the corresponding source relative to the particular end user, and assigning a priority value to the one of the received messages based upon the position in the a relationship hierarchy; computer usable program code for comparing for each one of the received messages, in response to the receipt of the one of the received messages, the priority value assigned to the one of the received messages to a pre-configured threshold value and permitting a message interruption for the one of the received messages prompting the particular end user to establish a collaborative session with a corresponding source of the one of the received messages only on condition that the priority value exceeds the a pre-configured threshold value; and, computer usable program code for responding to an activation of a particular application pre-specified by the end user by dynamically adjusting the threshold value such that for subsequently received messages, a different priority value when compared to the dynamically adjusted threshold value permits the message interruption.

11. The computer program product of claim 10, wherein the computer usable program code for permitting a message interruption only for ones of the received messages having a corresponding assigned priority which exceeds the pre-configured threshold value, comprises:
   computer usable program code for comparing the corresponding assigned priority to the pre-configured threshold value; and,
   computer usable program code for permitting an interruption for the message when the corresponding assigned priority crosses the pre-configured threshold value.

12. The computer program product of claim 11, wherein the computer usable program code for permitting a message interruption only for ones of the received messages having a corresponding assigned priority which exceeds the pre-configured threshold value comprises computer usable program code for permitting the interruption for the ones of the received messages when the assigned priority exceeds the pre-configured threshold value.

13. The computer program product of claim 11, wherein the computer usable program code for permitting a message interruption only for ones of the received messages having a corresponding assigned priority which exceeds the pre-configured threshold value comprises computer usable program code for permitting the interruption for the ones of the received messages when the assigned priority falls below the pre-configured threshold value.

14. The method of claim 6, wherein periodically adjusting the pre-configured threshold value responsive to detecting at least one of the activation of the particular application and the use of the particular peripheral device in the host computing platform for the messaging system, further comprises lowering the pre-configured threshold value upon determining the activation of the particular application in the host computing platform that indicates a desirability for collaboration.

15. The computer program product of claim 10, wherein the computer usable program code for periodically adjusting the pre-configured threshold value responsive to detecting at least one of the activation of the particular application and the use of a particular peripheral device in the host computing platform for the messaging system, comprises computer usable program code for lowering the pre-configured threshold value upon determining the activation of the particular application in the host computing platform that indicates a desirability for collaboration.

16. The system of claim 1, wherein the program code of the host state sensing logic enabled to adjust the pre-configured threshold value for permitting message interruptions for messages having assigned priorities beyond the pre-configured threshold value further comprises program code to lower the pre-configured threshold value upon determining the activation of the particular application indicates a desirability for collaboration.

17. The system of claim 1, wherein the program code of the host state sensing logic enabled to adjust the pre-configured threshold value for permitting message interruptions for messages having assigned priorities beyond the pre-configured threshold value further comprises program code to raise the pre-configured threshold value upon determining an interruption is undesirable based upon at least one of the activation of the particular application and the use of the particular peripheral device.

18. The method of claim 6, wherein the computer usable program code for periodically adjusting the pre-configured threshold value responsive to detecting at least one of the activation of the particular application and the use of the particular peripheral device further comprises computer usable program code for raising the pre-configured threshold value upon determining an interruption is undesirable based upon at least one of the activation of the particular application and the use of the particular peripheral device.

19. The computer program product of claim 10, wherein periodically adjusting the pre-configured threshold value responsive to detecting at least one of the activation of the particular application and the use of the particular peripheral device further comprises raising the pre-configured threshold value upon determining an interruption is undesirable based upon at least one of the activation of the particular application and the use of the particular peripheral device.

* * * * *